United States Patent
Longhurst (10) Patent No.: US 11,824,927 B2
(45) Date of Patent: Nov. 21, 2023

(54) PARTIAL TIMESTAMPS

(71) Applicant: TERADICI CORPORATION, Burnaby (CA)

(72) Inventor: Peter William Longhurst, Burnaby (CA)

(73) Assignee: Teradici Co., Burnaby (CA)

( * ) Notice: Subject to any disclaimer, the term of this patent is extended or adjusted under 35 U.S.C. 154(b) by 56 days.

(21) Appl. No.: 17/531,481

(22) Filed: Nov. 19, 2021

(65) Prior Publication Data

US 2023/0164217 A1    May 25, 2023

(51) Int. Cl.
*H04L 67/1095* (2022.01)

(52) U.S. Cl.
CPC ................ *H04L 67/1095* (2013.01)

(58) Field of Classification Search
None
See application file for complete search history.

(56) References Cited

U.S. PATENT DOCUMENTS

| | | | | |
|---|---|---|---|---|
| 2013/0346700 | A1* | 12/2013 | Tomlinson | G06F 9/526 711/E12.07 |
| 2016/0352793 | A1* | 12/2016 | Lee | H04L 65/611 |
| 2019/0018601 | A1* | 1/2019 | Dubeyko | G06F 3/0619 |
| 2019/0312903 | A1* | 10/2019 | Zini | H04L 61/103 |

OTHER PUBLICATIONS

Yang et al., "A Novel Representation and Compression for Queries on Trajectories in Road Networks", Apr. 6, 2018, IEEE, IEEE Transactions on Knowledge and Data Engineering (vol. 30, Issue: 4, pp. 613-629) (Year: 2018).*

* cited by examiner

*Primary Examiner* — Davoud A Zand
(74) *Attorney, Agent, or Firm* — Quarles & Brady LLP (57) ABSTRACT

In some examples, an electronic device includes a processor to determine a threshold magnitude. Based on the threshold magnitude, the processor is to determine a bit mapping for a partial timestamp. The partial timestamp is a sequence of bits of a timestamp that is based on a clock signal of the processor. The processor is to determine the partial timestamp based on the bit mapping and the timestamp, append the partial timestamp to a data signal, and cause transmission of the data signal.

12 Claims, 6 Drawing Sheets

PARTIAL TIMESTAMPS

BACKGROUND

Electronic devices such as desktops, laptops, notebooks, tablets, and smartphones enable remote user access utilizing other electronic devices. Remote user access enables a user to interact with and control applications and data stored to a host device while utilizing a client device. The host device, as used herein, is an electronic device that enables a remote user access. The client device, as used herein, is an electronic device that accesses the host device.

BRIEF DESCRIPTION OF THE DRAWINGS

Various examples are described below referring to the following figures.

DETAILED DESCRIPTION

As described above, systems that include host devices and client devices enable users to remotely access applications and data stored to the host devices utilizing the client devices. A remote session, as used herein, is a time period during which a client device remotely connects to a host device to receive data signals from the host device. The data signals include data for the applications, data, or a combination thereof, of the host device. An application, as used herein, is executable code that performs related tasks such as word processing, video streaming, etc. Data, as used herein, includes files (e.g., word processing documents, video files, audio files, etc.) and folders (e.g., directories housing a file or multiple files) of a host device. The remote session enables a user to utilize the host device from any client device that includes a network connection, for instance. However, responsive to a request for the host device to transmit multiple data signals, the client device may not receive the multiple data signals in a synchronized manner. For instance, a first data signal is an audio signal and a second data signal is a video signal. Responsive to the first data signal and the second data signal being out of synchronization, the user hears sound when the video does not show a corresponding action that generates the sound or shows the corresponding action after the sound plays. Alternately, the user sees action that generates sound but does not hear the sound or hears the sound after a delay. A lag time, as used herein, is an amount of time that the data signals are out of synchronization with each other. The lack of synchronization distracts the user and reduces user productivity. The unsynchronized manner is a result of a network connectivity issue that introduces a delay between transmission and receipt of the data signals, for instance. Network connectivity issues include bandwidth issues, network routing issues, physical connectivity issues, or any other issue that impacts a performance of a network. The unsynchronized manner is a result of intermittently generated data signals, in another instance. In yet another instance, the unsynchronized manner is a result of processing delays on the host device, the client device, or a combination thereof. The processing includes data compression, data decompression, or a combination thereof, for instance.

A host device may include a timestamp in a data signal to assist in synchronizing multiple data files. The timestamp, as used herein, is data that indicates when a date, a time, or a combination thereof, that the data signal is generated, transmitted, stored, or any other suitable eventful action that may occur in relation to the data signal. The timestamp is multi-byte data that is based on a system-level clock of the host device, for instance. While including timestamps in the multiple data signals enables the client device to synchronize the multiple data signals received from the host device, the timestamps increase a bandwidth utilized by the multiple data signals. Bandwidth, as used herein, is an amount of data that is transmitted over a network connection in a specified time period. The increased bandwidth of the multiple data signals may exacerbate network connectivity issues.

This description describes client devices that utilize partial timestamps to synchronize multiple data signals received from host devices. A partial timestamp, as used herein, is a sequence of bits of the timestamp that is based on the system-level clock of the host device. The host device generates the partial timestamp so as not to exceed a preexisting bandwidth of a data signal. The host device determines a threshold magnitude for the partial timestamp. The threshold magnitude, as used herein, is a number of unused bits in the data signal. The host device determines a bit mapping for the partial timestamp. The bit mapping, as used herein, indicates a number of bits to be utilized for the partial timestamp. A magnitude of the bit mapping is not to exceed the threshold magnitude. To determine the bit mapping, the host device determines a lower time threshold and an upper time threshold. The lower time threshold is a value that defines a lag time tolerance between multiple data signals. The upper time threshold is a time period that defines a networking delay tolerance, a signal processing delay, or a combination thereof, that a client device is able to compensate for without loss of data. The host device generates the timestamp for a data signal by utilizing a system-level clock of the host device. The host device generates the partial timestamp by utilizing the bit mapping to extract the bits of the timestamp that include the lower time threshold and the upper time threshold. The host device inserts the partial timestamp in the data signal and transmits the data signal.

The client device receives the data signal that includes the partial timestamp. The client device determines whether the partial timestamp is a first partial timestamp of a remote session. Responsive to the partial timestamp being a first partial timestamp of a remote session, the client device determines an origin time. The origin time is a start time for the remote session. Responsive to the data signal not including the first partial timestamp of the remote session, the client device determines a corrected elapsed time. To determine the corrected elapsed time, the client device generates a timestamp. The client device determines an uncorrected elapsed time by subtracting the origin time from the timestamp. The client device determines the corrected elapsed time by adding a result of rounding the uncorrected elapsed time to the nearest upper time threshold and the partial timestamp. The client device synchronizes data signals having a same corrected elapsed time. Synchronized data signals, as used herein, indicates that the client device causes a display device, an audio device, or a combination thereof, to simultaneously display, play, or a combination thereof, the data signals.

Utilizing the partial timestamp enhances a user experience and user productivity without exacerbating network connectivity issues. By determining the bit mapping for the partial timestamp, the host device appropriately scales the partial timestamp so as to not exceed a preexisting bandwidth of the data signal. Additionally, the partial timestamp is applicable regardless of a frequency with which data signals are generated by the host device. By utilizing the origin time and the upper time threshold, the client device synchronizes data signals with an accuracy that is equivalent to an accuracy of a system utilizing a multi-byte timestamp. Additionally, the system that includes the host device and the client device utilizing the partial timestamps to synchronize data signals operates regardless of whether the system-level clock of the host device is synchronized with the system-level clock of the client device. The system that includes the host device and the client device utilizing the partial timestamps to synchronize data signals compensates for differences between the system-level clock of the host device and the system-level clock of the client device.

In some examples in accordance with the present description, an electronic device is provided. The electronic device includes a processor to determine a threshold magnitude. Based on the threshold magnitude, the processor is to determine a bit mapping for a partial timestamp. The partial timestamp is a sequence of bits of a timestamp that is based on a clock signal of the processor. The processor is to determine the partial timestamp based on the bit mapping and the timestamp, append the partial timestamp to a data signal, and cause transmission of the data signal.

In other examples in accordance with the present description, an electronic device is provided. The electronic device includes a processor to receive a first data signal that includes a first partial timestamp and a second data signal that includes a second partial timestamp, determine a first corrected elapsed time and a second corrected elapsed time based on the first partial timestamp and the second partial timestamp, respectively, and, responsive to a determination that first corrected elapsed time is equivalent to the second corrected elapsed time, synchronize the first data signal and the second data signal.

In yet other examples in accordance with the present description, a non-transitory machine-readable medium is provided. The non-transitory machine-readable medium stores machine-readable instructions, which, when executed by a processor, cause the processor to receive a data signal that includes a partial timestamp, determine whether the data signal is a first data signal of a remote session, generate, responsive to a determination that the data signal is the first data signal of the remote session, an origin time for the remote session, determine, utilizing the origin time and the partial timestamp, a corrected elapsed time, and synchronize the data signal with other signals of the remote session having the corrected elapsed time.

As described herein, the terms "applications," "software," and "firmware" are considered to be interchangeable in the context of the examples provided. "Firmware" is considered to be machine-readable instructions that a processor of a computing device executes prior to execution of an operating system (OS), with a small portion that continues after an OS bootloader executes (e.g., a callback procedure), for example. "Applications" and "software" are considered broader terms than "firmware," and are considered to refer to machine-readable instructions that execute after the OS bootloader starts, through OS runtime, and until the computing device shuts down, for example. "Application," "software," and "firmware," as used herein, are referred to as executable code.

Figure 1:
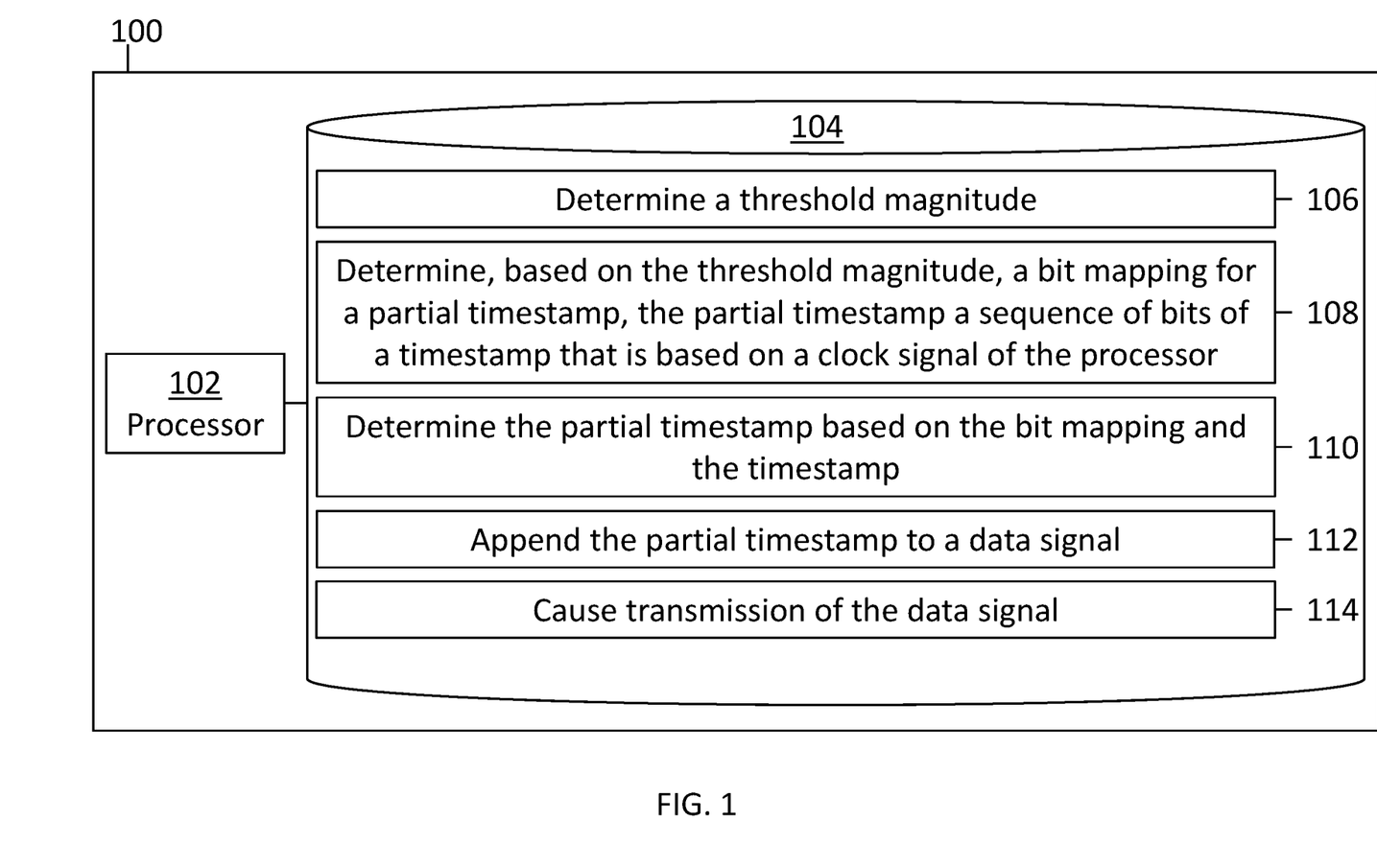
FIG. 1 is a block diagram depicting an electronic device generating partial timestamps for synchronization of data signals, in accordance with various examples.

Referring now to FIG. 1, a block diagram depicting an electronic device 100 utilizing partial timestamps to synchronize data signals is provided, in accordance with various examples. The electronic device 100 is a desktop, a laptop, a notebook, a tablet, a smartphone, or any other suitable computing device having hardware components, executable code, or a combination thereof, that enables remote access to the electronic device 100. The electronic device 100 is a host device, for example. The electronic device 100 includes a processor 102 and a storage device 104. The processor 102 is a microprocessor, a microcomputer, a microprocessor, a programmable integrated circuit, a programmable gate array, or other suitable device for managing operations of the electronic device 100 or operations of a component or multiple components of the electronic device 100. For example, the processor 102 is a central processing unit (CPU), a graphics processing unit (GPU), or an embedded security processor (EpSC). In another example, the processor 102 is a network interface controller that manages signals transmitted, received, or a combination thereof, via a network connection. The storage device 104 is a hard drive, a solid state drive (SSD), flash memory, random access memory (RAM), or other suitable memory for storing data or machine-readable instructions of the electronic device 100.

In some examples, the processor 102 is coupled to the storage device 104. While the storage device 104 is shown as a separate component of the electronic device 100, in other examples, the storage device 104 is integrated with the processor 102. While not explicitly shown, the electronic device 100 may include network interfaces, video adapters, sound cards, local buses, peripheral devices (e.g., a keyboard, a mouse, a touchpad, a speaker, a microphone, a display device), or a combination thereof.

In various examples, the storage device 104 stores machine-readable instructions, which, when executed, cause the processor 102 to perform some or all of the actions attributed herein to the processor 102. The machine-readable instructions are the machine-readable instructions 106, 108, 110, 112, 114. The machine-readable instructions 106, 108, 110, 112, 114, when executed by the processor 102, cause the processor 102 to generate partial timestamps for synchronization of data signals. The machine-readable instruction 106, when executed by the processor 102, causes the processor 102 to determine a threshold magnitude. The machine-readable instruction 108, when executed by the processor 102, causes the processor 102 to determine, based on the threshold magnitude, a bit mapping for a partial timestamp. The partial timestamp is a sequence of bits of a timestamp that is based on a clock signal of the processor 102, for example. The machine-readable instruction 110, when executed by the processor 102, causes the processor 102 to determine the partial timestamp based on the bitmapping and the timestamp. The machine-readable instruction 112, when executed by the processor 102, causes the processor 102 to append the partial timestamp to a data signal.

The machine-readable instruction 114, when executed by the processor 102, causes the processor 102 to cause transmission of the data signal.

As described above, the processor 102 generates the partial timestamp so that a number of bits of the partial timestamp does not exceed the threshold magnitude. As defined above, the threshold magnitude is a number of unused bits in a data signal. Because a number of unused bits in a data signal may vary between multiple data signals, in various examples, the machine-readable instruction 106, when executed by the processor 102, causes the processor 102 to determine a threshold magnitude by determining a number of unused bits in a portion of the data signal that has a fixed size across multiple data signals. In some examples, the processor 102 determines that the portion of the data signal that has fixed size across multiple data signals is a header of the data signal. The header includes routing data for the data signal, for example. The routing data includes an identifier of the electronic device 100, an identifier of an intended recipient of the data signal (e.g., a client device), a number of related data signals to be transferred, a size of the data signal, an identifier of the data signal, identifiers of related data signals, or any other suitable data for routing the data signal via a network or multiple networks, for example. In various examples, the related data signals may herein be referred to as a data stream. In other examples, the data stream may include related data signals as well as unrelated data signals. For example, the related data signals include data signals associated with a first application and the unrelated data signals include data signals associated with a second application.

In some examples, the processor 102 determines that a contiguous number of bits of the header is unused. For example, the processor 102 determines that an 8-byte header includes 4 unused bits in a first byte of the 8 bytes. The processor 102 determines that the threshold magnitude is 4 bits. In other examples, the processor 102 determines that a noncontiguous number of bits of the header is unused. For example, a 6-byte header includes 2 unused bits in a second byte of the 6 bytes and 6 unused bits in a fifth byte of the 6 bytes. In some examples, the processor 102 determines that the threshold magnitude is a total number of unused bits of the header. For example, the processor 102 determines that the threshold magnitude is 8 bits. In other examples, the processor 102 determines that the threshold magnitude is a largest group of contiguous unused bits. For example, the processor 102 determines that the threshold magnitude is 6 bits.

As described above, the processor 102 determines a bit mapping for the partial timestamp such that a magnitude of the bit mapping does not exceed the threshold magnitude. In various examples, to determine, based on the threshold magnitude, the bit mapping for the partial timestamp, the processor 102 is to determine a lower time threshold, determine an upper time threshold, and determine the bit mapping based on the lower time threshold and the upper time threshold. The lower time threshold is a value that defines a lag time tolerance between the multiple data signals. For example, the processor 102 determines that the multiple data signals are to have no more than a 4 millisecond (ms) lag time from each other and determines that the lower time threshold is 4 ms. In another example, the processor 102 determines that the multiple data signals are to have no more than a 1 second (sec) lag time from each other and determines that the lower time threshold is 1 sec. For example, the processor 102 determines that the upper time threshold is 508 ms. In another example, the processor 102 determines that the upper time threshold is 1 minute (min).

In various examples, a manufacturer of the electronic device 100 specifies the lower time threshold, the upper time threshold, or a combination thereof, at a time of manufacture. In other examples, a manufacturer of a network interface card specifies the lower time threshold, the upper time threshold, or a combination thereof, at a time of manufacture. In some examples, the lower time threshold, the upper time threshold, or a combination thereof, is specified post-manufacture. For example, an owner or administrator (e.g., such as an owner's representative) of the electronic device 100 specifies the lower time threshold, the upper time threshold, or a combination thereof. In another example, a specification or standard that governs operations of a network specify the lower time threshold, the upper time threshold, or a combination thereof. In various examples, an owner, an administrator, a user, or a combination thereof, utilizes a graphical user interface (GUI) to specify the lower time threshold, the upper time threshold, or a combination thereof. The processor 102 determines the lower time threshold, the upper time threshold, or a combination thereof, by retrieving the specified values from memory locations storing the values. For example, lower time threshold, the upper time threshold, or a combination thereof, are stored to the storage device 104.

Utilizing the threshold magnitude, the lower time threshold, the upper time threshold, or a combination thereof, the processor 102 determines the bit mapping for the partial timestamp. For example, responsive to a lower time threshold of 4 ms and an upper time threshold of 508 ms, the processor 102 determines the bit mapping for the partial timestamp is a 7-bit map. The 7-bit map represents a time period that covers 4 to 512 ms, for example. In another example, responsive to a lower time threshold of 1 sec and an upper time threshold of 1 min, the processor 102 determines the bit mapping for the partial timestamp is a 6-bit map. The 6-bit map represents a time period that covers 1 to 63 sec, for example. In various examples, the processor 102 compares the magnitude of the bit mapping to the threshold magnitude to determine whether a magnitude of the bit mapping is equivalent to or less than the threshold magnitude. In some examples, responsive to the processor 102 determining that the magnitude of the bit mapping exceeds the threshold magnitude, the processor 102 determines whether another portion of the data signal includes a number of contiguous unused bits equivalent to or exceeding the magnitude of the bit mapping. In other examples, responsive to the processor 102 determining that the magnitude of the bit mapping exceeds the threshold magnitude, the processor 102 determines whether another portion of the data signal includes a number of noncontiguous unused bits equivalent to or exceeding the magnitude of the bit mapping. By ensuring the bit mapping does not exceed the threshold magnitude, the processor 102 appropriately scales the partial timestamp so as to not exceed a preexisting bandwidth of the data signal.

In various examples, the processor 102 determines the lower time threshold, the upper time threshold, or a combination thereof, responsive to a relationship between the data signals included within a data stream. The relationship is that the data signals are associated with a same application, have a same type (e.g., audio signals, video signals), or a combination thereof. For example, the data stream includes a first set of data signals that are video signals of a first application and a second set of data signals that include video signals and audio signals of a second application. The processor 102 determines a first lower time threshold, a first upper time threshold, or a combination thereof for the first set of data signals and a second lower time threshold, a second upper time threshold, or a combination thereof for the second set of data signals. Utilizing the first lower time threshold, the first upper time threshold, or the combination thereof, the processor 102 determines a first bitmapping for the first set of data signals. Utilizing the second lower time threshold, the second upper time threshold, or the combination thereof, the processor 102 determines a second bitmapping for the second set of data signals.

In some examples, the processor 102 determines whether the first lower time threshold, the first upper time threshold, or a combination thereof is greater than the second lower time threshold, the second upper time threshold, or a combination thereof. Responsive to a determination that the first lower time threshold is greater than the second lower time threshold, the processor 102 determines that the second lower time threshold is to be utilized as the lower time threshold for the data stream. By utilizing the second lower time threshold, the processor 102 ensures a higher degree of accuracy in the synchronization of the data signals of the data stream. For example, utilizing the second lower time threshold ensures that a second video signal is displayed an appropriate time after a first video signal, so as to ensure the smoothness of the video presentation. Responsive to a determination that the first upper time threshold is greater than the second upper time threshold, the processor 102 determines that the first upper time threshold is to be utilized as the upper time threshold for the data stream. By utilizing the first upper time threshold, the processor 102 ensures a sufficient time is allotted for processing of the data signals of the data stream, for example.

As described above, a partial timestamp is a sequence of bits of the timestamp that is based on the system-level clock of the electronic device 100. In various examples, the machine-readable instruction 110, when executed by the processor 102, causes the processor 102 to determine the partial timestamp based on the bitmapping and the timestamp by generating the timestamp and applying the bitmapping to the timestamp. In some examples, the processor 102 generates the timestamp by utilizing a system-level clock of the electronic device 100. For example, the system-level clock is a clock signal of the processor 102. In another example, the system-level clock is a hardware component (not explicitly shown) of the electronic device 100. In other examples, the processor 102 generates the timestamp by determining a time elapsed since a start point. The start point is a start of a remote session, for example. The processor 102 determines the time elapsed by subtracting a time of the system-level clock associated with the start point from a current time of the system-level clock, for example. As described below with respect to FIG. 1, the processor 102 generates the partial timestamp by utilizing the bit mapping to extract the bits of the timestamp that include the lower time threshold and the upper time threshold.

In various examples, the processor 102 appends the partial timestamp to the unused bits of the data signal associated with the threshold magnitude. The processor 102 causes transmission of the data signal. For example, the processor 102 causes a network interface card (not explicitly shown) to transmit the data signal. By applying the bitmapping to the timestamp, the processor 102 generates a partial timestamp that is usable regardless of a frequency with which data signals are generated by the electronic device 100.

Figure 2:
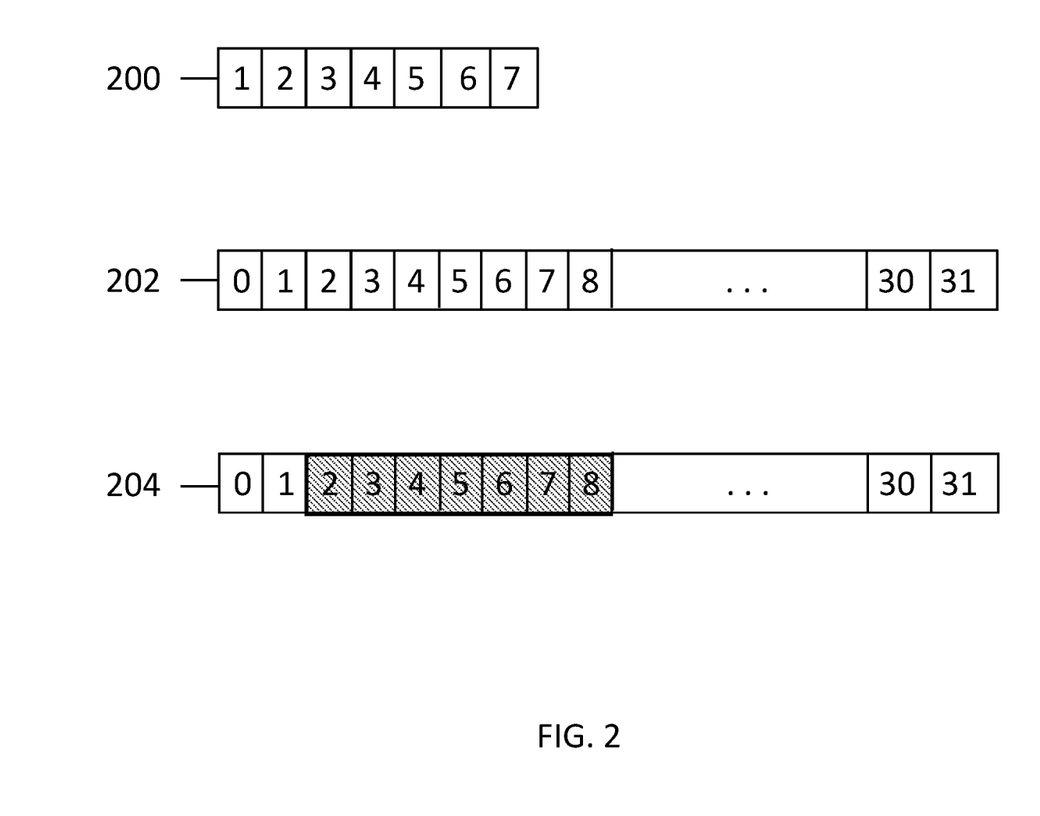
FIG. 2 is a diagram depicting an electronic device generating a partial timestamp for synchronizing a data signal, in accordance with various examples.

Referring now to FIG. 2, a diagram depicting an electronic device (e.g., the electronic device 100) generating a partial timestamp for synchronizing a data signal is provided, in accordance with various examples. A bit mapping 200 includes 7 bits number from 1 to 7 to represent a magnitude of the bit mapping 200. A timestamp 202 includes 32 bits of data having bits numbered from 0 to 31. A partial timestamp 204, indicated by gray hashing, includes 7 bits (e.g., bits 2-8) of the timestamp 202.

A processor (e.g., the processor 102) of the electronic device determines the bit mapping 200 has a magnitude of 7 bits utilizing the techniques described above with respect to FIG. 1. Utilizing the techniques described above with respect to FIG. 1, the processor generates the timestamp 202. The processor determines the partial timestamp 204, as indicated by the gray hashing, is equivalent to an overlap of a portion of the timestamp and the bit mapping, where the overlap includes a first bit associated with the lower time threshold and a second bit associated with the upper time threshold. For example, responsive to the lower time threshold having a value of 4 ms and the upper time threshold having a value of 508 ms, the processor determines that the seven bits of the timestamp 202 that represent the lower time threshold and the upper time threshold are the third to ninth least significant bits of the timestamp 202 (e.g., bits 2-8). For example, bit 2 of the timestamp 202 is associated with values up to 7 ms, and bit 8 of the timestamp is associated with values up to 512 ms. As described above with respect to FIG. 1, in various examples, the processor appends the partial timestamp 204 to the unused bits of the data signal. For example, the processor extracts bits 2-8 of timestamp 202 and store them to the unused bits of the data signal associated with the threshold magnitude.

Figure 3:
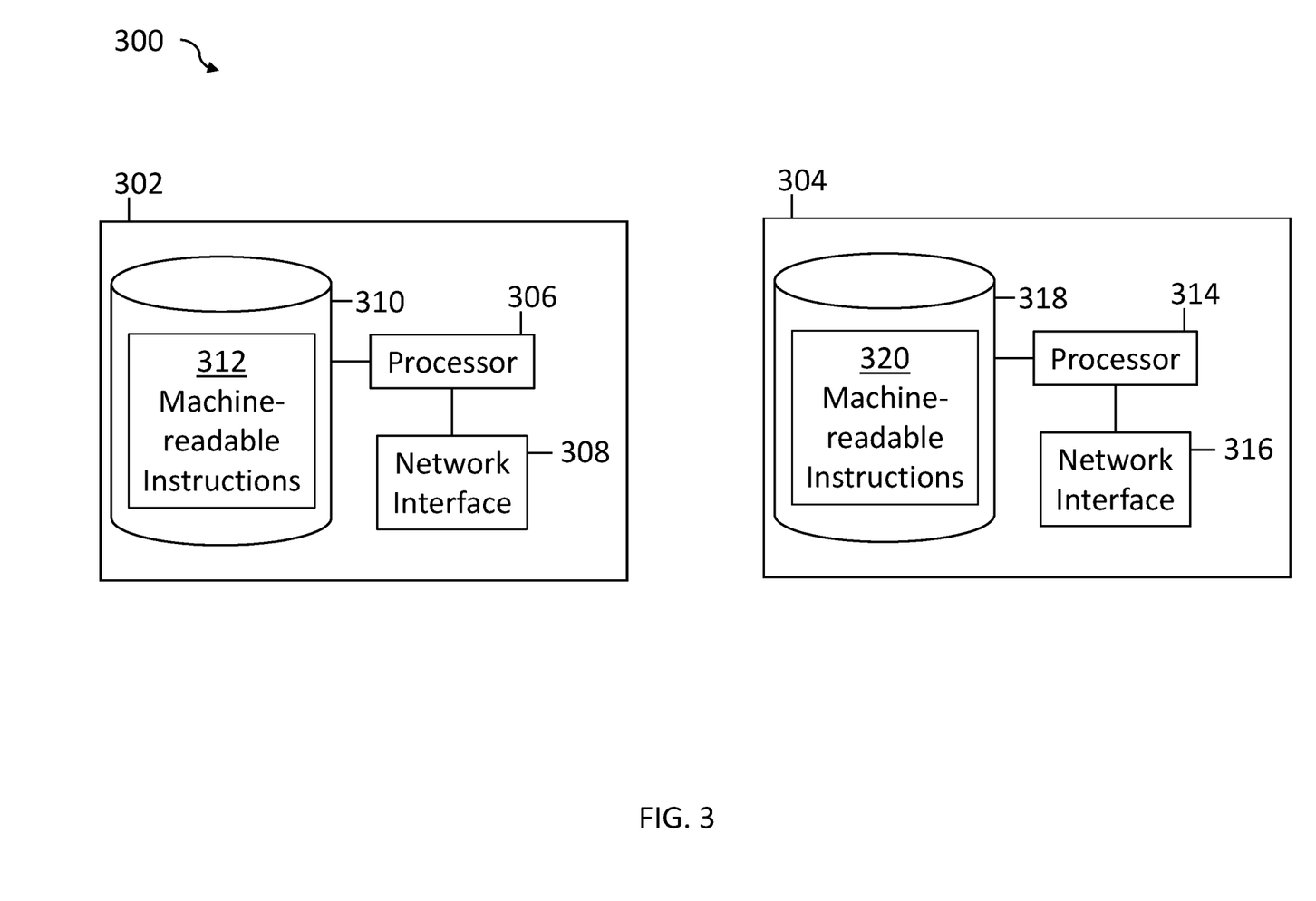
FIG. 3 is a block diagram depicting a system utilizing partial timestamps to synchronize data signals, in accordance with various examples.

Referring now to FIG. 3, a block diagram depicting a system 300 utilizing partial timestamps to synchronize data signals is provided, in accordance with various examples. The system 300 includes the electronic device 302, 304. The electronic device 302 is the electronic device 100, for example. The electronic device 302 is a host device, for example. The electronic device 304 is a client device, for example.

In various examples, the electronic device 302 includes a processor 306, a network interface 308, and a storage device 310. The processor 306 is the processor 102, for example. The network interface 308 enables communication over a network. The network interface 308 may include a wired connection, such as Ethernet or universal serial bus (USB), or a wireless connection, such as WI-FI® or BLUETOOTH®. The storage device 310 is the storage device 104, for example.

In some examples, the processor 306 couples to the network interface 308 and the storage device 310. The network interface 308 couples to the processor 306. The storage device 310 couples to the processor 306. While the processor 306, the network interface 308, and the storage device 310 are shown as separate components of the electronic device 302, in other examples, the processor 306, the network interface 308, and the storage device 310 are integrated in a single component such as an integrated circuit (IC).

In various examples, the electronic device 304 is a desktop, a laptop, a notebook, a tablet, a smartphone, or any other suitable computing device that enables a user to remotely access the electronic device 302. The electronic device 304 includes a processor 314, a network interface 316, and a storage device 318. The processor 314 is a microprocessor, a microcomputer, a microprocessor, a programmable integrated circuit, a programmable gate array, or other suitable device for managing operations of the electronic device 304 or operations of a component or multiple components of the electronic device 304. For example, the processor 314 is a CPU, a GPU, or an EpSC. In another example, the processor 314 is a network interface controller that manages signals transmitted, received, or a combination thereof, via the network interface 316. The network interface 316 enables communication over a network. The network interface 316 may include a wired connection, such as Ethernet or USB, or a wireless connection, such as WI-FI® or BLUETOOTH®. The storage device 318 is a hard drive, a solid state drive (SSD), flash memory, random access memory (RAM), or other suitable memory for storing data or machine-readable instructions of the electronic device 304. The storage device 318 is a USB drive, for example.

In some examples, the processor 314 couples to the network interface 316 and the storage device 318. The network interface 316 couples to the processor 314. The storage device 318 couples to the processor 314. While the processor 314, the network interface 316, and the storage device 318 are shown as separate components of the electronic device 304, in other examples, the processor 314, the network interface 316, and the storage device 318 are integrated in a single component such as an IC. While not explicitly shown, the electronic device 304 may include video adapters, sound cards, local buses, peripheral devices (e.g., a keyboard, a mouse, a touchpad, a speaker, a microphone, a display device), or a combination thereof.

In various examples, the storage device 310 stores machine-readable instructions, which, when executed, cause the processor 306 to perform some or all of the actions attributed herein to the processor 306. The machine-readable instructions are the machine-readable instructions 312. The machine-readable instructions 312 are the machine-readable instructions 106, 108, 110, 112, 114, for example. The machine-readable instructions 312, when executed by the processor 306, cause the processor 306 to generate partial timestamps for synchronization of data signals. The processor 306 generates the partial timestamps for synchronization of the data signals utilizing the techniques described above with respect to FIG. 1, for example. The processor 306 causes transmissions of the data signals via the network interface 308, for example.

In some examples, the storage device 318 stores machine-readable instructions, which, when executed, cause the processor 314 to perform some or all of the actions attributed herein to the processor 314. The machine-readable instructions are the machine-readable instructions 320. The machine-readable instructions 320, when executed by the processor 314, cause the processor 314 to utilize partial timestamps to synchronize data signals.

For example, the processor 314 receives a data signal that includes a partial timestamp via the network interface 316. The processor 314 determines whether the partial timestamp is a first partial timestamp of a remote session. For example, the processor 314 generates a timestamp and compares the timestamp to a timestamp generated at the start of the remote session. In some examples, the processor 314 generates the timestamp by utilizing a system-level clock of the electronic device 304. For example, the system-level clock is a clock signal of the processor 314. In another example, the system-level clock is a hardware component (not explicitly shown) of the electronic device 304. Responsive to a determination that the partial timestamp is the first partial timestamp of the remote session, the processor 314 determines an origin time for the remote session. For example, the processor 314 determines the origin time by generating a timestamp of the electronic device 304. Responsive to the data signal not including the first partial timestamp of the remote session, the processor 314 determines a corrected elapsed time. To determine the corrected elapsed time, the processor 314 determines an uncorrected elapsed time generating a timestamp and subtracting the origin time from the generated timestamp. The processor 314 determines the corrected elapsed time by adding a result of rounding the uncorrected elapsed time to the nearest upper time threshold and the partial timestamp. The processor 314 synchronizes data signals having a same corrected elapsed time.

In various examples, the processor 314 causes transmission of a request via the network interface 316 to establish a remote session with the electronic device 302 via a network. The network is a local area network (LAN), a wide area network (WAN) (e.g., the Internet), a virtual private network (VPN), an enterprise private network (EPN), or any other suitable system that connects electronic devices for sharing data, for example. In some examples, the remote session enables a virtual desktop that enables a user to access applications and data of the electronic device 302. In other examples, the processor 314 receives a first data signal via the network interface 316. Upon receipt of the first data signal, the processor 314 determines that the remote session with the electronic device 302 is established. In various examples, responsive to establishment of the remote session, the processor 314 receives a data signal that includes the threshold magnitude, the bit mapping, the lower time threshold, the upper time threshold, or a combination thereof.

During a first portion of the remote session, the user utilizes a video streaming application of the electronic device 302. During the video streaming application, the electronic device 302 transmits a first data signal that includes an audio signal of a video and a second data signal that includes a video signal of the video. During a second portion of the remote session, the user utilizes a word processing application of the electronic device 302. The electronic device 302 transmits a data signal that includes a video signal of the word processing application. During a third portion of the remote session, the user utilizes the video streaming application of the electronic device. Utilizing the partial timestamps to synchronize the different data signals, the processor 314 ensures that an audio signal of the video streaming application is synchronized with the video signal of the video streaming application instead of with the video signal of the word processing application. For example, during the transition from the first portion of the remote session to the second portion of the remote session, the processor 314 receives an audio signal for the video of the video streaming application. Responsive to the uncorrected elapsed time of the audio signal having a value closer to a previous corrected elapsed time, the processor 314 determines that the corrected elapsed time is the uncorrected elapsed time rounded downward added to the partial timestamp. The processor 314 receives a video signal of the word processing application. Responsive to the uncorrected elapsed time of the video signal having a value closer to a next corrected elapsed time, the processor 314 determines that the corrected elapsed time is the uncorrected elapsed time rounded upward added to the partial timestamp. Responsive to the audio signal having a different corrected elapsed time than the video signal, the processor 314 does not synchronize the audio signal and the video signal. In some examples, the processor 314 does not play the audio signal. In other examples, the processor 314 plays the audio signal and then subsequently displays the video signal.

In another example, during a first portion of the remote session, the user utilizes a first sensor (not explicitly shown) and a second sensor (not explicitly shown) of the electronic device 302 to record a first data signal and a second data signal, respectively. The electronic device 302 transmits the first and the second data signals. During a second portion of the remote session, the user utilizes a word processing application of the electronic device 302. The electronic device 302 transmits a data signal that includes a video signal of the word processing application. During a third portion of the remote session, the user utilizes the video streaming application of the electronic device. Utilizing the partial timestamps to synchronize the different data signals, the processor 314 ensures that the data signals are synchronized with other data signals of the associated portion of the remote session.

By utilizing the origin time and the upper time threshold, the processor 314 synchronizes data signals of different portions of the remote session with an accuracy that is equivalent to an accuracy of another system utilizing a multi-byte timestamp. Additionally, the system 300 that includes the electronic device 302 (e.g., the host device) and the electronic device 304 (e.g., the client device) utilizing the partial timestamps to synchronize data signals operates regardless of whether the system-level clock of the host device is synchronized with the system-level clock of the client device. The system 300 that includes the electronic device 302 and the electronic device 304 utilizing the partial timestamps to synchronize data signals compensates for differences between the system-level clock of the host device and the system-level clock of the client device.

Figure 4:
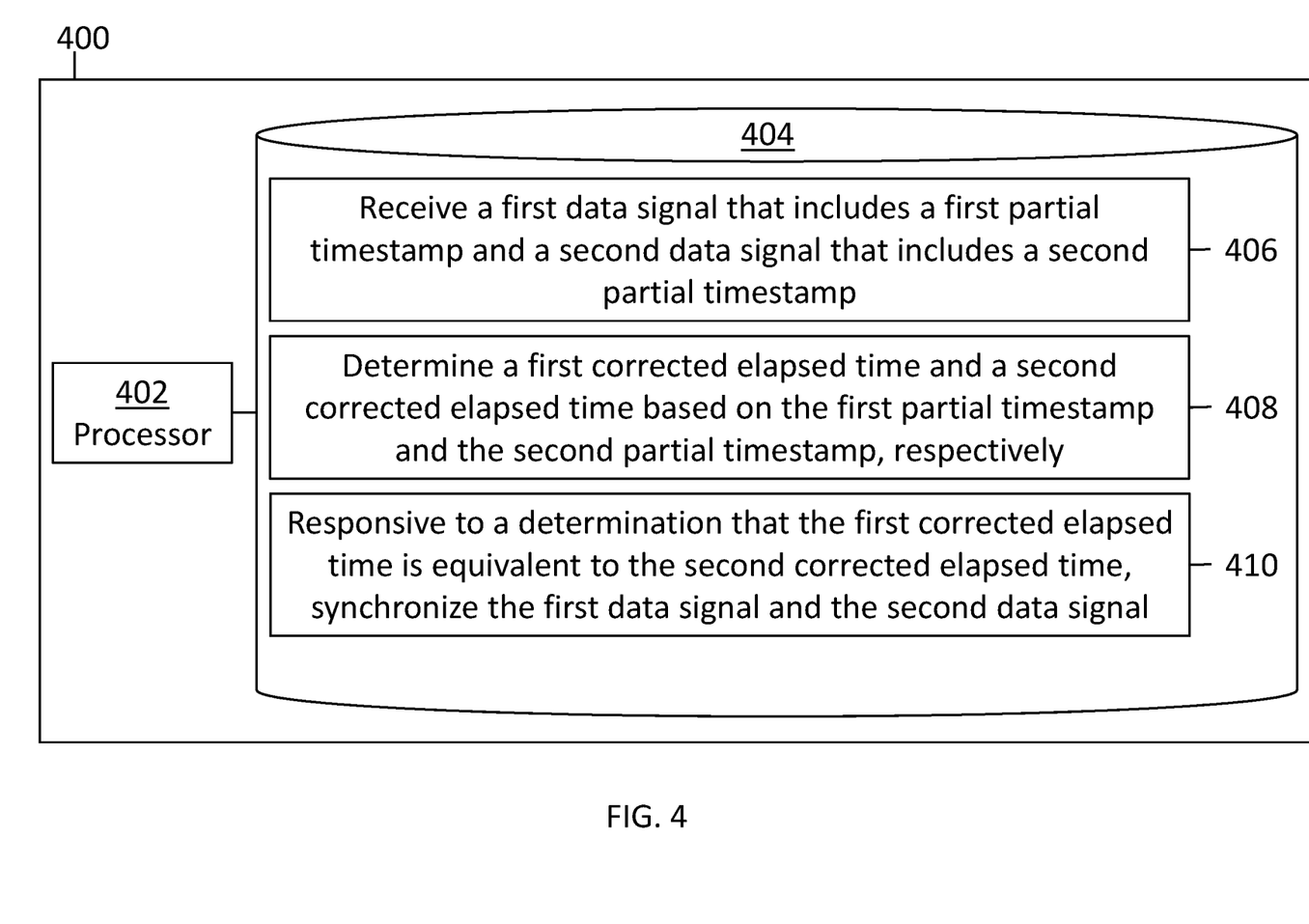
FIG. 4 is a block diagram depicting an electronic device utilizing partial timestamps to synchronize data signals, in accordance with various examples.

Referring now to FIG. 4, a block diagram depicting an electronic device 400 utilizing partial timestamps to synchronize data signals is provided, in accordance with various examples. The electronic device 400 is the electronic device 304, for example. The electronic device 400 includes a processor 402 and a storage device 404. The processor 402 is the processor 314, for example. The storage device 404 is the storage device 318, for example. In various examples, the processor 402 and the storage device 404 are coupled as described above with respect to FIG. 3.

In various examples, the storage device 404 stores machine-readable instructions, which, when executed, cause the processor 402 to perform some or all of the actions attributed herein to the processor 402. The machine-readable instructions are the machine-readable instructions 406, 408, 410, for example. In some examples, the machine-readable instructions 406, 408, 410 are the machine-readable instructions 320, for example.

In some examples, the machine-readable instructions 406, 408, 410, when executed by the processor 402, cause the processor 402 to utilize partial timestamps to synchronize data signals. The machine-readable instruction 406, when executed by the processor 402, causes the processor 402 to receive a first data signal that includes a first partial timestamp and a second data signal that includes a second partial timestamp. The first and the second data signals are received from a host device, for example. The host device is the electronic device 100, 302, for example. The machine-readable instruction 408, when executed by the processor 402, cause the processor 402 to determine a first corrected elapsed time and a second corrected elapsed time based on the first partial timestamp and the second partial timestamp, respectively. Responsive to a determination that the first corrected elapsed time is equivalent to the second corrected elapsed time, the machine-readable instruction 410, when executed by the processor 402, causes the processor 402 to synchronize the first data signal and the second data signal.

In various examples, the first corrected elapsed time and the second corrected elapsed time are determined utilizing the techniques described above with respect to FIG. 3. For example, to determine the first corrected elapsed time, the processor 402 generates a timestamp. The processor 402 determines an uncorrected elapsed time by subtracting an origin time from the timestamp. The processor 402 rounds the uncorrected elapsed time to a nearest upper time threshold. The processor 402 adds a result of the rounding and the first partial timestamp. The processor 402 repeats the technique for the second data signal.

In some examples, the processor 402 determines whether the first data signal is a signal of a first data stream received during a remote session. Responsive to a determination that the first data signal is a signal of the first data stream, the processor 402 determines the origin time and sets a counter to zero. The processor 402 generates a timestamp and determines the origin time is equivalent to the timestamp, for example. The counter, as used herein, is to track a number of sequential, non-overlapping intervals that have elapsed since a beginning of the remote session. An interval, as used herein, is equivalent to the upper time threshold. In another example, the processor 402 generates the timestamp and subtracts the counter from the generated timestamp to determine the origin time. Responsive to a determination that the first data signal is not a signal of the first data stream, the processor 402 determines a corrected elapsed time.

In various examples, responsive to a rounding downward of the uncorrected elapsed time, the processor 402 decrements the counter by one. Responsive to a rounding upward of the uncorrected elapsed time, the processor 402 increments the counter by one. The processor 402 synchronizes data signals having a same corrected elapsed time within a same interval, as indicated by the counter associated with the corrected elapsed time. The processor 402 causes a display device (not explicitly shown), an audio device (not explicitly shown), or a combination thereof, to simultaneously display, play, or a combination thereof, the data signals having the same corrected elapsed time within a same interval.

Figure 5:
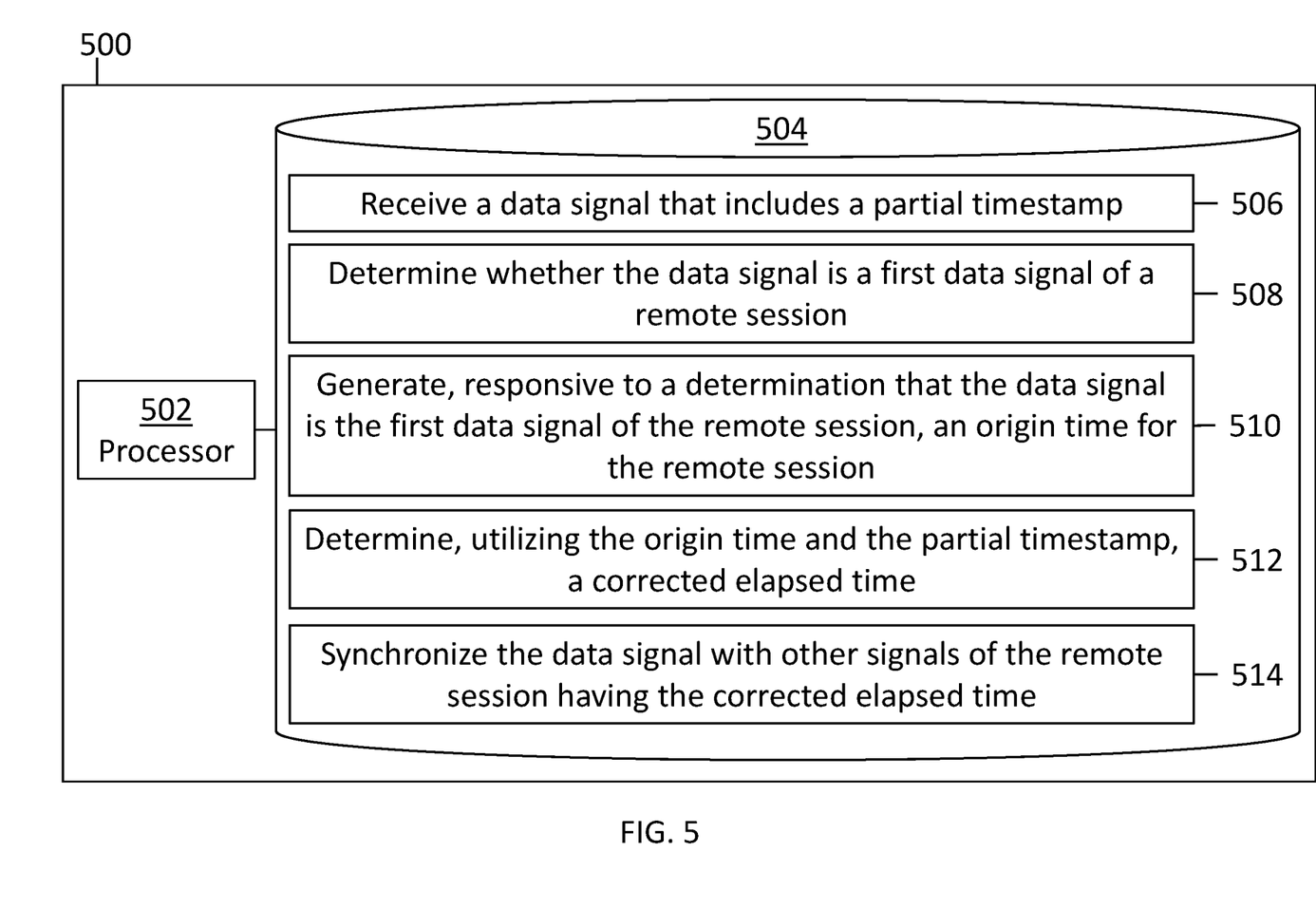
FIG. 5 is a block diagram depicting an electronic device utilizing partial timestamps to synchronize data signals, in accordance with various examples.

Referring now to FIG. 5, a block diagram depicting an electronic device 500 utilizing partial timestamps to synchronize data signals is provided, in accordance with various examples. The electronic device 500 is the electronic device 304, 400, for example. The electronic device 500 includes a processor 502 and a non-transitory machine-readable medium 504. The processor 502 is the processor 314, 402, for example. The non-transitory machine-readable medium 504 is the storage device 318, 404, for example. The term "non-transitory" does not encompass transitory propagating signals.

In various examples, the processor 502 couples to the non-transitory machine-readable medium 504. The non-transitory machine-readable medium 504 stores machine-readable instructions. The machine-readable instructions are the machine-readable instructions 506, 508, 510, 512, 514. The machine-readable instructions 506, 508, 510, 512, 514, when executed by the processor 502, cause the processor 502 to perform some or all of the actions attributed herein to the processor 502.

In some examples, when executed by the processor 502, the machine-readable instructions 506, 508, 510 cause the processor 502 to utilize a partial timestamp to synchronize data signals. The machine-readable instruction 506, when executed by the processor 502, causes the processor 502 to receive a data signal that includes a partial timestamp. The processor 502 receives the data signal from a host device, for example. The host device is the electronic device 100, 302, for example. The machine-readable instruction 508, when executed by the processor 502, causes the processor 502 to determine whether the data signal is a first data signal of a remote session. The processor 502 determines whether the data signal is the first data signal of the remote session utilizing the techniques described above with respect to FIG. 3 or 4, for example. Responsive to a determination that the data signal is the first data signal of the remote session, the machine-readable instruction 510, when executed by the processor 502, causes the processor 502 to generate an origin time for the remote session. The processor 502 generates the origin time for the remote session utilizing the techniques described above with respect to FIG. 3 or 4, for example. The machine-readable instruction 512, when executed by the processor 502, causes the processor 502 to utilize the origin time and the partial timestamp to determine a corrected elapsed time. The machine-readable instruction 514, when executed by the processor 502, causes the processor 502 to synchronize the data signal with other signals of the remote session having the corrected elapsed time. The processor 502 synchronizes the data signal with the other signals of the remote session having the corrected elapsed time utilizing the techniques described above with respect to FIG. 3 or 4, for example.

In various examples, responsive to the determination that the data signal is the first data signal of the remote session, the processor 502 sets a counter to zero, as described above with respect to FIG. 4. In some examples, utilizing the techniques described above with respect to FIG. 3 or 4, to determine the corrected elapsed time, the processor 502 generates a timestamp. The processor 502 determines an uncorrected elapsed time by subtracting the origin time from the timestamp. The processor 502 rounds the uncorrected elapsed time to a nearest upper time threshold. In various examples, responsive to rounding the uncorrected elapsed time downward, the processor 502 decrements the counter, and, responsive to rounding the uncorrected elapsed time upward, the processor 502 increments the counter. The processor 502 adds a result of the rounding and the partial timestamp. In some examples, to synchronize the data signal with other signals of the remote session having the corrected elapsed time, the processor 502 is to cause a display device (not explicitly shown), an audio device (not explicitly shown), or a combination thereof, to display, play, or a combination thereof, the data signal with the other signals having the same corrected elapsed time within a same interval, where the interval is indicated by the counter.

While components and circuits of the electronic device 100, 302, 304, 400, 500 described herein are shown as discrete components and circuits, in other examples, the components, circuits, or a combination thereof are integrated circuits (IC) that perform some or all the actions attributed to the discrete components, circuits, or combination thereof, included in the IC. Except where infeasible (e.g., block functionality of a component, a circuit, or a combination thereof), the components, circuits, or a combination thereof, may be included in an IC.

Figure 6:
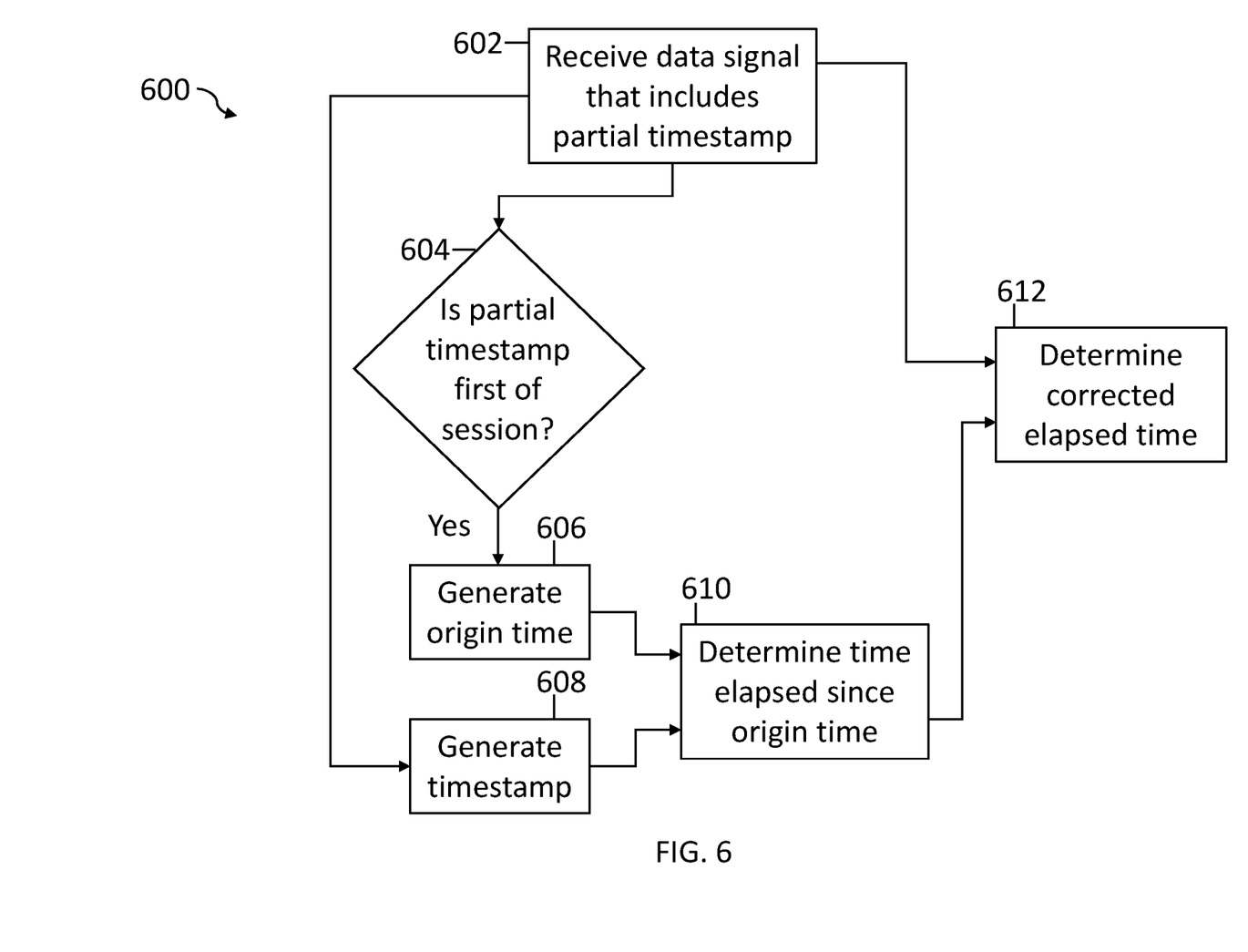
FIG. 6 is a flow diagram depicting a method for an electronic device to utilize partial timestamps to synchronize data signals, in accordance with various examples.

Referring now to FIG. 6, a flow diagram depicting a method 600 for an electronic device (e.g., the electronic device 304, 400, 500) utilizing partial timestamps to synchronize data signals is provided, in accordance with various examples. The method 600 includes receiving a data signal that includes a partial timestamp (602). The data signal is received from a host device, for example. The host device is the electronic device 100, 302, for example. The method 600 also includes determining whether the partial timestamp is a first partial timestamp of a remote session (604). Responsive to a determination that the partial timestamp is the first partial timestamp of the remote session, the method 600 includes generating an origin time (606). The origin time is generated utilizing the techniques described above with respect to FIG. 3, 4, or 5, for example. The method 600 includes generating a timestamp (608). The timestamp is generated utilizing the techniques described above with respect to FIG. 3, for example. Additionally, the method 600 includes determining a time elapsed since the origin time based on the timestamp and the origin time (610). The method 600 determines a corrected elapsed time utilizing the partial timestamp and the time elapsed since the origin time (612). The corrected elapsed time is determined utilizing the techniques described above with respect to FIG. 3, 4, or 5, for example.

In various examples, a processor (e.g., the processor 314, 402, 502) of the electronic device generates a timestamp. The processor determines the time elapsed since the origin time by subtracting the origin time from the generated timestamp.

In some examples, the processor performs the method 600 for the data signals of a data stream. As described above with respect to FIG. 1, the data stream may include related data signals, unrelated data signals, or a combination thereof. For example, a data stream includes data signals of a first application and data signals of a second application. The processor performs the method 600 for the multiple data signals of the data stream. In some examples, the processor determines that a first set of the multiple data signals have a first corrected elapsed time and a second set of the multiple data signals have a second corrected elapsed time. The processor determines whether the first set of the multiple data signals or the second set of the multiple data signals is earlier in time. Responsive to the first set of the multiple data signals being earlier in time, the processor causes a display device (not explicitly shown), an audio device (not explicitly shown), or a combination thereof, to display, play, or a combination thereof, the first set of the multiple data signals and queues the second set of the multiple data signals. Queue, as used herein, indicates that data is temporarily stored to a storage device (e.g., the storage device 318,404, the non-transitory machine-readable medium 504, or any other suitable storage device not explicitly shown). The processor causes the display device (not explicitly shown), the audio device (not explicitly shown), or the combination thereof, to display, play, or the combination thereof, the second set of the multiple data signals after the first set of the multiple data signals. Responsive to the second set of the multiple data signals being earlier in time, the processor causes the display device (not explicitly shown), the audio device (not explicitly shown), or the combination thereof, to display, play, or the combination thereof, the second set of the multiple data signals and queues the first set of the multiple data signals. The processor causes the display device (not explicitly shown), the audio device (not explicitly shown), or the combination thereof, to display, play, or the combination thereof, the first set of the multiple data signals after the second set of the multiple data signals.

Utilizing the method 600 enhances a user experience and user productivity without exacerbating network connectivity issues. A system that utilizes the method 600 operates regardless of whether a system-level clock of a host device is synchronized with a system-level clock of the client device that implements the method 600. Additionally, the system that utilizes the method 600 compensates for differences between the system-level clock of the host device and the system-level clock of the client device.

Unless infeasible, some or all of the method 600 may be performed by the electronic device concurrently or in different sequences and by circuitry of the electronic device, execution of machine-readable instructions of the electronic device, or a combination thereof. For example, the method 600 is implemented by machine-readable instructions stored to a storage device (e.g., the storage device 318, 404, the non-transitory machine-readable medium 504, or another storage device not explicitly shown (e.g., a USB drive coupled to the electronic device)) of the electronic device, circuitry (some of which is not explicitly shown) of the electronic device, or a combination thereof. A processor (e.g., the processor 314, 402, 502) of the electronic device executes the machine-readable instructions to perform some or all of the method 600, for example. In another example, digital logic gates (not explicitly shown), a counter circuit (not explicitly shown), or a combination thereof couple to the processor. The digital logic gates, the counter circuit, or the combination thereof, utilize various inputs to generate outputs that the processor utilizes as inputs, for example.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
    a processor to:
        determine a threshold magnitude;
        determine, based on the threshold magnitude, a bit mapping for a partial timestamp, the partial timestamp a sequence of bits of a timestamp that is based on a clock signal of the processor, wherein a magnitude of the bit mapping is equivalent to or less than the threshold magnitude;
        determine the partial timestamp based on the bit mapping and the timestamp;
        append the partial timestamp to a data signal; and
        cause transmission of the data signal.

2. The electronic device of claim 1, wherein to determine the threshold magnitude, the processor is to determine a number of unused bits in a portion of the data signal that has a fixed size across multiple data signals.

3. The electronic device of claim 1, wherein to determine the bit mapping for the partial timestamp, the processor is to:
    determine a lower time threshold;
    determine an upper time threshold; and
    determine the bit mapping based on the lower time threshold and the upper time threshold.

4. The electronic device of claim 3, wherein the partial timestamp is equivalent to an overlap of a portion of the timestamp and the bit mapping, the overlap including a first bit associated with the lower time threshold and a second bit associated with the upper time threshold.

5. An electronic device, comprising:
    a processor to:
        receive a first data signal that includes a first partial timestamp and a second data signal that includes a second partial timestamp;
        determine a first corrected elapsed time and a second corrected elapsed time based on the first partial timestamp and the second partial timestamp, respectively, wherein to determine the first corrected elapsed time, the processor is to utilize a system-level clock of the electronic device to generate a timestamp; and
        responsive to a determination that first corrected elapsed time is equivalent to the second corrected elapsed time, synchronize the first data signal and the second data signal.

6. The electronic device of claim 5, wherein to determine the first corrected elapsed time, the processor is to:
    determine an uncorrected elapsed time by subtracting an origin time from the timestamp;
    rounding the uncorrected elapsed time to a nearest upper time threshold; and
    adding a result of the rounding and the first partial timestamp.

7. The electronic device of claim 6, wherein the origin time is a start time for a remote session.

8. The electronic device of claim 6, wherein an upper time threshold is a time period that defines a networking delay tolerance, a signal processing delay, or a combination thereof, that the electronic device is able to compensate for without loss of data.

9. A non-transitory machine-readable medium storing machine-readable instructions, which, when executed by a processor, cause the processor to:
    receive a data signal that includes a partial timestamp;
    determine whether the data signal is a first data signal of a remote session;
    generate, responsive to a determination that the data signal is the first data signal of the remote session, an origin time for the remote session;
    determine, utilizing the origin time and the partial timestamp, a corrected elapsed time,
        wherein, to determine the corrected elapsed time, the processor is to generate a time stamp;
    determine an uncorrected elapsed time by subtracting the origin time from the timestamp;
    round the uncorrected elapsed time to a nearest upper time threshold; and
    add a result of the rounding and the partial timestamp; and
    synchronize the data signal with other signals of the remote session having the corrected elapsed time.

10. The non-transitory machine-readable medium of claim 9, wherein, responsive to the determination that the data signal is the first data signal of the remote session, the processor is to set a counter to zero.

11. The non-transitory machine-readable medium of claim 10, wherein, responsive to rounding the uncorrected elapsed time downward, the processor is to decrement a counter; and wherein, responsive to rounding the uncorrected elapsed time upward, the processor is to increment the counter.

12. The non-transitory machine-readable medium of claim 11, wherein, to synchronize the data signal with other signals of the remote session having the corrected elapsed time, the processor is to cause a display device, an audio device, or a combination thereof, to display, play, or a combination thereof, the data signal with the other signals having the same corrected elapsed time within a same interval, the interval indicated by the counter.

\* \* \* \* \*